United States Patent
Matsuzawa

(10) Patent No.: US 8,630,243 B2
(45) Date of Patent: Jan. 14, 2014

(54) BASE STATION AND METHOD USED IN MOBILE COMMUNICATIONS SYSTEM

(75) Inventor: Hiromu Matsuzawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 528 days.

(21) Appl. No.: 12/559,243

(22) Filed: Sep. 14, 2009

(65) Prior Publication Data
US 2010/0067471 A1  Mar. 18, 2010

Related U.S. Application Data

(63) Continuation of application No. PCT/JP2007/055264, filed on Mar. 15, 2007.

(51) Int. Cl.
*H04W 4/00* (2009.01)
(52) U.S. Cl.
USPC .......................................................... 370/329
(58) Field of Classification Search
USPC ........................................ 370/328, 329, 335
See application file for complete search history.

(56) References Cited

U.S. PATENT DOCUMENTS

| | | | |
|---|---|---|---|
| 6,011,786 A | 1/2000 | Dent | |
| 6,157,627 A | 12/2000 | Olofsson et al. | |
| 7,016,319 B2* | 3/2006 | Baum et al. | 370/329 |
| 7,738,422 B2* | 6/2010 | Das et al. | 370/330 |
| 2004/0190482 A1 | 9/2004 | Baum et al. | |
| 2005/0058097 A1* | 3/2005 | Kang et al. | 370/329 |
| 2007/0025459 A1 | 2/2007 | Kaminski et al. | |
| 2007/0121538 A1 | 5/2007 | Ode et al. | |
| 2008/0062914 A1* | 3/2008 | Olfat | 370/321 |
| 2008/0062944 A1* | 3/2008 | Smith et al. | 370/342 |

FOREIGN PATENT DOCUMENTS

| | | |
|---|---|---|
| EP | 0924897 A2 | 6/1999 |
| JP | 06245261 | 9/1994 |
| JP | 2002505065 | 2/2002 |
| JP | 2004529524 | 9/2004 |
| JP | 2007043693 | 2/2007 |
| JP | 2007150971 | 6/2007 |

OTHER PUBLICATIONS

International Search Report dated Jun. 19, 2007.

(Continued)

*Primary Examiner* — Mark Rinehart
*Assistant Examiner* — Mohammad Anwar
(74) *Attorney, Agent, or Firm* — Smith, Gambrell & Russell, LLP

(57) ABSTRACT

A base station belongs to one of plural cells using a same portion of a system bandwidth including a part that determines which of user apparatuses existing in a service area should be assigned one or more resource block units, the resource block unit having predetermined bandwidth and time period and being identified by a shared resource number shared by the cells; a part that grades the user apparatuses based on their wireless transmission statuses and determines ranking numbers corresponding to the user apparatuses; a part that generates assignment information indicating which of the user apparatuses should be assigned to which of the resource block units according to a predetermined corresponding relationship between the shared resource number and the ranking number; and a part that reports the assignment information to the user apparatuses. The predetermined corresponding relationship is determined to be different among the cells using the same frequency bandwidth.

10 Claims, 15 Drawing Sheets

(56) References Cited

OTHER PUBLICATIONS

3GPP TSG RAN1#44 Motorola: "EUTRA SC-FDMA Uplink Resource Block, Resource Allocation & TP", 3GPP DRAFT; R1-060389_UL RB_RA+TP, 3rd Generation Partnership Project (3GPP), Mobile Competence Centre; 650, Route Des Lucioles; F-06921 Sophia-Antipolis Cedex, France, vol. RAN WG1, No. Denver, USA; 20060209, Feb. 9, 2006, XP050101334, [retrieved on Feb. 2, 2009].

Extended European Search Report dated Oct. 22, 2012 received in Application No. 07738714.0-1249 / 2139249.

* cited by examiner

FIG.3

| | f1 | f2 | f3 | f4 | f5 |
|---|---|---|---|---|---|
| | A | A | B | B | C |
| | A | A | B | B | C |
| | D | D | D | D | C |
| | D | D | D | D | C |
| | E | E | E | F | F |
| | E | E | E | G | G |
| | H | H | H | H | H |
| | I | I | I | J | J |
| | I | I | I | J | J |
| | I | I | I | J | J |

FIG.4

| preamble | FCH | DL BURST#1 | DL BURST#5 | UL BURST#5 | |
| | DL MAP | | | UL BURST#1 | |
| | | DL BURST#2 | | | |
| | UL MAP | DL BURST#3 | | UL BURST#2 | UL BURST#3 |
| | | DL BURST#4 | | UL BURST#4 | |

FIG.8

| | t1 | t2 | t3 | t4 | t5 | t6 | t7 | t8 |
|---|---|---|---|---|---|---|---|---|
| f1 | t1f1 | t2f1 | t3f1 | t4f1 | t5f1 | t6f1 | t7f1 | t8f1 |
| f2 | t1f2 | t2f2 | t3f2 | t4f2 | t5f2 | t6f2 | t7f2 | t8f2 |
| f3 | t1f3 | t2f3 | t3f3 | t4f3 | t5f3 | t6f3 | t7f3 | t8f3 |
| f4 | t1f4 | t2f4 | t3f4 | t4f4 | t5f4 | t6f4 | t7f4 | t8f4 |
| f5 | t1f5 | t2f5 | t3f5 | t4f5 | t5f5 | t6f5 | t7f5 | t8f5 |
| f6 | t1f6 | t2f6 | t3f6 | t4f6 | t5f6 | t6f6 | t7f6 | t8f6 |
| f7 | t1f7 | t2f7 | t3f7 | t4f7 | t5f7 | t6f7 | t7f7 | t8f7 |
| f8 | t1f8 | t2f8 | t3f8 | t4f8 | t5f8 | t6f8 | t7f8 | t8f8 |
| f9 | t1f9 | t2f9 | t3f9 | t4f9 | t5f9 | t6f9 | t7f9 | t8f9 |
| f10 | t1f10 | t2f10 | t3f10 | t4f10 | t5f10 | t6f10 | t7f10 | t8f10 |
| f11 | t1f11 | t2f11 | t3f11 | t4f11 | t5f11 | t6f11 | t7f11 | t8f11 |
| f12 | t1f12 | t2f12 | t3f12 | t4f12 | t5f12 | t6f12 | t7f12 | t8f12 |

SUB-CARRIER OF SEGMENTATION GROUP 1 (f1–f4)

SUB-CARRIER OF SEGMENTATION GROUP 2 (f5–f8)

SUB-CARRIER OF SEGMENTATION GROUP 3 (f9–f12)

FIG.9

| | t1 | t2 | t3 | t4 | t5 | t6 | t7 | t8 | |
|---|---|---|---|---|---|---|---|---|---|
| | 1 | 5 | 9 | 13 | 17 | 21 | 25 | 29 | f1 |
| | 2 | 6 | 10 | 14 | 18 | 22 | 26 | 30 | f2 |
| | 3 | 7 | 11 | 15 | 19 | 23 | 27 | 31 | f3 |
| | 4 | 8 | 12 | 16 | 20 | 24 | 28 | 32 | f4 |

SUB-GROUP 1

| | t1 | t2 | t3 | t4 | t5 | t6 | t7 | t8 | |
|---|---|---|---|---|---|---|---|---|---|
| | 25 | 29 | 1 | 5 | 9 | 13 | 17 | 21 | f1 |
| | 26 | 30 | 2 | 6 | 10 | 14 | 18 | 22 | f2 |
| | 27 | 31 | 3 | 7 | 11 | 15 | 19 | 23 | f3 |
| | 28 | 32 | 4 | 8 | 12 | 16 | 20 | 24 | f4 |

SUB-GROUP 2

| | t1 | t2 | t3 | t4 | t5 | t6 | t7 | t8 | |
|---|---|---|---|---|---|---|---|---|---|
| | 17 | 21 | 25 | 29 | 1 | 5 | 9 | 13 | f1 |
| | 18 | 22 | 26 | 30 | 2 | 6 | 10 | 14 | f2 |
| | 19 | 23 | 27 | 31 | 3 | 7 | 11 | 15 | f3 |
| | 20 | 24 | 28 | 32 | 4 | 8 | 12 | 16 | f4 |

SUB-GROUP 3

| | t1 | t2 | t3 | t4 | t5 | t6 | t7 | t8 | |
|---|---|---|---|---|---|---|---|---|---|
| | 9 | 13 | 17 | 21 | 25 | 29 | 1 | 5 | f1 |
| | 10 | 14 | 18 | 22 | 26 | 30 | 2 | 6 | f2 |
| | 11 | 15 | 19 | 23 | 27 | 31 | 3 | 7 | f3 |
| | 12 | 16 | 20 | 24 | 28 | 32 | 4 | 8 | f4 |

SUB-GROUP 4

FIG.10

| SUB-GROUP 1 | | | | | | | | SUB-GROUP 2 | | | | | | | | SUB-GROUP 3 | | | | | | | | SUB-GROUP 4 | | | | | | | | TOTAL (TOTAL OF MS QUALITY ORDER NUMBER OF NEIGHBORING 4 CELLS) | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| 1 | 5 | 32 | 28 | 9 | 24 | 20 | 13 | 32 | 28 | 1 | 5 | 24 | 9 | 13 | 20 | 9 | 13 | 24 | 20 | 1 | 5 | 28 | 32 | 24 | 20 | 13 | 9 | 28 | 32 | 5 | 1 | 66 | 66 | 66 | 66 | 66 | 66 | 66 | 66 |
| 2 | 6 | 31 | 27 | 10 | 23 | 19 | 14 | 31 | 27 | 2 | 6 | 23 | 10 | 14 | 19 | 10 | 14 | 23 | 19 | 2 | 6 | 27 | 31 | 23 | 19 | 14 | 10 | 27 | 31 | 6 | 2 | 66 | 66 | 66 | 66 | 66 | 66 | 66 | 66 |
| 3 | 7 | 30 | 26 | 11 | 22 | 18 | 15 | 30 | 26 | 3 | 7 | 22 | 11 | 15 | 18 | 11 | 15 | 22 | 18 | 3 | 7 | 26 | 30 | 22 | 18 | 15 | 11 | 26 | 30 | 7 | 3 | 66 | 66 | 66 | 66 | 66 | 66 | 66 | 66 |
| 4 | 8 | 29 | 25 | 12 | 21 | 17 | 16 | 29 | 25 | 4 | 8 | 21 | 12 | 16 | 17 | 12 | 16 | 21 | 17 | 4 | 8 | 25 | 29 | 21 | 17 | 16 | 12 | 25 | 29 | 8 | 4 | 66 | 66 | 66 | 66 | 66 | 66 | 66 | 66 |

FIG.14

| MS WITHIN SERVICE AREA CELL 1 | MS1 | MS2 | MS3 | | |
|---|---|---|---|---|---|
| RECEPTION LEVEL | −90 | −100 | −80 | | |
| MS WITHIN SERVICE AREA CELL 2 | MS4 | MS5 | MS6 | | |
| RECEPTION LEVEL | −95 | −85 | −80 | | |
| MS WITHIN SERVICE AREA CELL 3 | MS7 | MS8 | MS9 | MS10 | |
| RECEPTION LEVEL | −70 | −85 | −105 | −80 | |
| MS WITHIN SERVICE AREA CELL 4 | MS11 | MS12 | MS13 | MS14 | |
| RECEPTION LEVEL | −95 | −90 | −100 | −85 | |
| MS WITHIN SERVICE AREA CELL 5 | MS15 | MS16 | | | |
| RECEPTION LEVEL | −90 | −95 | | | |

| CELL 1 | SUB-GROUP 1 |
|---|---|
| CELL 2 | SUB-GROUP 2 |
| CELL 3 | SUB-GROUP 3 |
| CELL 4 | SUB-GROUP 4 |
| CELL 5 | SUB-GROUP 1 |

FIG.15

CELL 1 SUB-GROUP 1

| | t1 | t2 | t3 | t4 | t5 | t6 | t7 | t8 | |
|---|---|---|---|---|---|---|---|---|---|
| | MS2 | MS1 | MS3 | | | | | | f1 |
| | MS2 | MS1 | MS3 | | | | | | f2 |
| | MS2 | MS1 | MS3 | | | | | | f3 |
| | MS2 | MS1 | MS3 | | | | | | f4 |

CELL 2 SUB-GROUP 2

| | t1 | t2 | t3 | t4 | t5 | t6 | t7 | t8 | |
|---|---|---|---|---|---|---|---|---|---|
| | | | MS4 | MS5 | MS6 | | | | f1 |
| | | | MS4 | MS5 | MS6 | | | | f2 |
| | | | MS4 | MS5 | MS6 | | | | f3 |
| | | | MS4 | MS5 | MS6 | | | | f4 |

FIG.16

| CELL 1 | CELL 2 | CELL 3 | CELL 4 | CELL 5 |
|---|---|---|---|---|
| | | MS7 MS7 MS7 MS7 | MS11 MS11 MS11 MS11 | MS15 MS15 MS15 MS15 |
| | | MS10 MS10 MS10 MS10 | MS13 MS13 MS13 MS13 | MS16 MS16 MS16 MS16 |
| | | MS8 MS8 MS8 MS8 | | |
| | MS6 MS6 MS6 MS6 | MS9 MS9 MS9 MS9 | | |
| | MS5 MS5 MS5 MS5 | | | |
| MS2 MS2 MS2 MS2 | MS4 MS4 MS4 MS4 | | | |
| MS1 MS1 MS1 MS1 | | | MS14 MS14 MS14 MS14 | |
| MS2 MS2 MS2 MS2 | | | MS12 MS12 MS12 MS12 | |

BASE STATION AND METHOD USED IN MOBILE COMMUNICATIONS SYSTEM

CROSS-REFERENCE TO RELATED APPLICATIONS

This patent application is a continuation of International Application Number PCT/JP2007/055264 filed in Japan on Mar. 15, 2007, the entire contents of which are incorporated herein by reference.

FIELD

The embodiments discussed herein are related to a base station and method used in a mobile communications system.

ART

In a mobile communications system using a cellular method, cells are designed so that undetected service areas are not created. As for known cell configurations, there is a method of designing an area with omni-cells using omnidirectional antennas and a method of a 3 sector cell or 6 sector cells constituting a base station area using directional antennas.

In order to sufficiently allocate the cells and efficiently use limited frequency resources, it is necessary to satisfactorily restrain interference from adjacent and proximal cells. In other words, the frequency allocation method is to be decided so that the interference level from other cells using the same frequency is no greater than a permissible value. With CDMA (Code Division Multiple Access), adjacent cells can use the same frequency because separation with spread codes can be performed. However, with FDMA (Frequency Division Multiple Access), adjacent cells, at least, cannot use the same frequency. Although non-adjacent cells can use the same frequency, the cells using the same frequency are to be separated from each other at a sufficient distance, so that interference between the cells or interference between users can be reduced to a permissible level. By doing so, frequencies can be reused and frequency usage efficiency can be improved. In other words, neighboring cells can exhibit interference no greater than a permissible value by being grouped so that the cells use different frequencies rather than using the same frequency. Accordingly, although the same frequency cannot be used within the same group, the same frequency can be repetitively used by other groups located far from the group. Thereby, a limited number of frequencies can be efficiently used.

By dividing a frequency band to be assigned to a system operator with the number of cells in a single group, the width of the frequency band per cell can be determined. Accordingly, by reducing the number of divisions, that is, by repetitively reducing the distance, more frequencies can be assigned to each base station. Thus, more traffic can be accommodated and frequencies can be used more efficiently.

FIG. 1 illustrates an example of repetition of 3 cells. A, B, and C use bandwidths of different center frequencies. FIG. 1 illustrates how interference is prevented by prohibiting adjacent cells from using the same frequency. Further, FIG. 1 illustrates that the interference level becomes no greater than a permissible value if the distance between base stations is 3 times the cell radius. FIG. 1 also illustrates frequency allocation in a case where cells are assigned the same frequency.

In a system using, for example, WiMAX, OFDMA (Orthogonal Frequency Division Multiple Access) may be used as a multi-channel access method. With this method in which a frequency bandwidth is divided into plural sub-channels, the same sub-channel cannot be simultaneously assigned to adjacent base stations or to sectors of a base station. Accordingly, all cells share the same frequency bandwidth (frequency bandwidth of a center frequency having a given bandwidth) while preventing interference among cells and improving frequency usage efficiency. A method of dividing a bandwidth of a system using an OFDMA method into plural clusters is described in, for example, Japanese Laid-Open Publication No. 2004-529524.

For example, there is a method of assigning fixed frequencies by obtaining an allocation beforehand so that interference can be controlled to a value no greater than a permissible value. With WiMAX, the division of sub-channels is referred to as "segmentation". The bandwidth allocated to the system is divided into 3 segments (collection of sub-channels).

For example, 3 adjacent cells constitute a single group, as illustrated in FIG. 2. Each of seg1, seg2, and seg3 corresponds to a sub-channel group obtained by dividing a frequency bandwidth having the same center frequency. The same sub-channel group is not reused within the same group. Three different sub-channel groups are used in each of 3 cells. Further, the same sub-channel is not reassigned within a single group and not among adjacent cells, to thereby perform operations while preventing interference.

With WiMAX, a resource which can be assigned in a next frame is determined in response to a resource assignment request of a given time. The resource assignment request does not only correspond to a case where an access request signal is transmitted as an actual signal from a mobile station (MS) but also corresponds to a case where a mobile station is carrying data to be transmitted. For example, a state where data to be transmitted are accumulated in a queue for accumulating data may represent a "request".

As illustrated in FIG. 3, a resource assignment plan can be represented with a matrix having a frequency axis (axis in which sub-carriers are arranged) and a time axis. The content of the resource assignment plan is reported to the mobile station.

FIG. 4 illustrates an example of a format used for mobile communications. The "Preamble" is used for synchronization by a mobile station; the "DL MAP" is data indicating a resource assignment plan of a downlink; and the "UL MAP" is data indicating a resource assignment plan of an uplink. Each mobile station can perform burst communication using a resource block assigned to the mobile station itself by confirming the DL MAP data or the UL MAP data or both. In the illustrated example, TDD (time division duplexing) is used, and uplink (UL) communication is performed after performing downlink (DL) communication. Then, although not illustrated, the same operation is repeated when a "Preamble" transmitted again from the mobile station is received. This method is not a channel assignment method that assigns a resource selected from resources available at the instant of receiving a resource assignment request, but is a method that assigns resources reserved for future use.

Further, with WiMAX, a data modulation method and an encoding code are selected at the same time of assigning channel resources according to a wireless status of a mobile station (MS). With respect to a mobile station (MS) that is located in the vicinity of a base station and has a satisfactory reception quality, a modulation method having a high transmission rate such as 64 QAM is assigned. On the other hand, with respect to a mobile station located at a cell boundary (mobile station being located far from a base station and having a poor reception quality), a modulation method having a low transmission rate such as QPSK is assigned. By suitably selecting a combination of a data modulation method and a channel encoding method according to the status of a channel, the throughput of a mobile station can be increased as high as possible according to the environment of the mobile station.

With an ideal allocation of hexagonal cells, even in a case where interference among cells using the same sub-channel can be controlled to a value which produces no less a predetermined SIR (Signal to Interference Ratio), the interference may actually become greater than a theoretical value due to factors such as inconsistency of a base station allocation, inconsistency of a cell shape, and inconsistency of an actual radio wave transmission environment. Therefore, it becomes difficult to ensure necessary quality (SIR). As a result, throughput may be degraded and generation of coverage holes may occur.

FIG. 5 illustrates how a shape of an actual cell is deviated from an ideal hexagonal shape. In a case where the shape of a cell is ideal, interference waves from other cells using the same frequency are controlled to be below to a value no greater than a permissible value. This state is illustrated in FIG. 6. In a case where the shape of a cell is deviated from an ideal hexagonal shape, the interference waves from other cells using the same frequency surpass a permissible value. This state is illustrated in FIG. 7.

With WiMAX, a sub-channel number equivalent to logical channel division and a sub-carrier number equivalent to physical channel division do not match on a one-to-one basis but are relatively randomized with respect to each cell. Accordingly, the probability of "sub-carrier collision" in which the same sub-channel is simultaneously assigned to different mobile stations among cells using the same frequency bandwidth can be reduced. Interference becomes less as traffic becomes less. Thus, transmission quality can be maintained at a certain degree. In other words, in a case where a small number of sub-channels is sufficient for communications, the probability of sub-carrier collision is statistically low because sub-carrier numbers are randomly selected for each base station where the same frequency bandwidth (sub-carrier group) is used among the cells.

However, with this method, the probability of collision becomes higher as the usage rate of sub-carriers is increased by growth of traffic. In a case of a full load (a state of congested traffic where each cell needs to use all of a third of a frequency bandwidth divided into thirds), collision and interference always occur. Thus, there is a concern of degrading of quality.

In a typical resource assigning method, numerous determination criteria are referred to for determining the mobile station (MS) to which a resource is to be assigned in response to requests from mobile stations of each cell requesting resource assignment. One example of a determination criterion is the quality of each mobile station (MS) in which the mobile station capable of exhibiting higher throughput is selected. Another example of the determination criterion is the opportunity of assignment in which resources are assigned to the mobile stations with a certain degree of evenness so that assignment of resources is not prioritized to a certain mobile station. Although the modulation method assigned to the selected mobile station (MS) is adaptively set, the location of the resource (location on time axis and frequency axis on matrix) to be assigned is randomly selected. This is because it is easier to attain a desired quality by assigning an arbitrary resource among the resources assigned to each cell to the mobile station (MS) in view of considering interference reduction by performing sub-channel division. Because the selected mobile station (MS) and the resource location are independently assigned in each cell, the assigning status of other nearby cells is not considered. Thus, in some cases, interference between cells may be large. For example, in a case where the same sub-channel is used by cells (not an adjacent cell but next to the adjacent cell), the location of the two mobile stations (MS) to which the same sub-carrier is simultaneously assigned may be a location where interference easily occurs or where interference is applied (typically, cell edge). In such a case, interference of the actual field is very likely to become no less than the permissible value.

Increasing the number of groups in which the sub-channel is divided or narrowing the frequency bandwidth used by the groups may be considered for reducing interference of other cells. However, with these methods, transmission delays result due to the narrowing of bandwidths. Thus, there is a concern for loss of throughput.

Accordingly, there is a desire for a sub-carrier assigning method for reducing the influence of interference where traffic load is large without having to increase the number of divided frequencies Further, in a case where the influence of interference is large, it becomes necessary to strictly perform system quality confirmation (e.g., running test during designing of actual base station or running test prior to operation of the system) and adjustment of the original base station. Therefore, there is a concern of the number of steps for the confirmation and the number of steps for the adjustment becoming too many. It is desired to alleviate such strict constraints in designing frequency allocation and to reduce the number of optimum steps.

SUMMARY

According to an aspect of the invention, there is provided a base station belonging to one of plural cells using a same portion of a system bandwidth, including: a part configured to determine which user apparatus among the user apparatuses existing in a service area should be assigned one or more resource block units, the resource block unit having a predetermined bandwidth and a predetermined time period and being identified by a shared resource number shared by the plural cells; a part configured to grade the plural user apparatuses based on wireless transmission statuses of the plural user apparatuses and determine ranking numbers corresponding to the plural user apparatuses; a part configured to generate assignment information indicating which of the plural user apparatus should be assigned to which of the resource block units according to a predetermined corresponding relationship between the shared resource number and the ranking number; and a part configured to report the assignment information to the corresponding plural user apparatuses; wherein the predetermined corresponding relationship is determined to be different among the plural cells using the same frequency bandwidth.

Additional objects and advantages of the embodiments are set forth in part in the description which follows, and in part will become obvious from the description, or may be learned by practice of the invention.

The object and advantages of the invention may be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF THE DRAWINGS

FIG. 3 is a diagram illustrating an example of an arrangement of resources assigned to users A-J;

FIG. 4 is a diagram illustrating an example of a frame format;

FIG. 8 is a diagram illustrating an example of shared resource number used in an embodiment of the present invention;

FIG. 9 is a diagram illustrating an example of a corresponding relationship between a shared resource number and an MS quality order number;

FIG. 10 is a diagram illustrating another example of a corresponding relationship between a shared resource number and an MS quality order number;

FIG. 14 is a diagram illustrating an example of a reception level;

FIG. 15 is a diagram illustrating how resources are assigned according to a corresponding relationship between a shared resource number and an MS quality order number;

FIG. 16 is a diagram illustrating how resources are assigned according to a corresponding relationship between a shared resource number and an MS quality order number.

DESCRIPTION OF EMBODIMENT(S)

Figure 1:
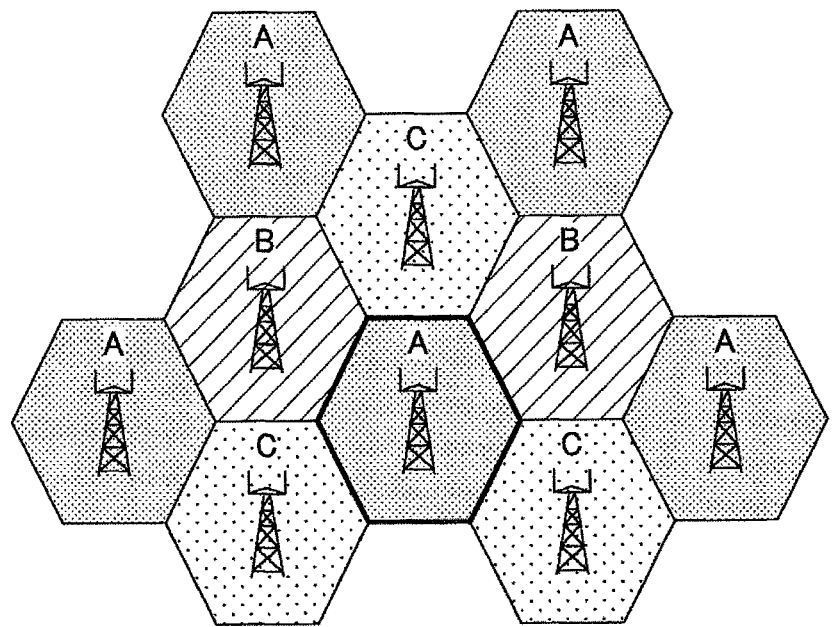
FIG. 1 is a diagram illustrating an example of a cell configuration.
Figure 2:
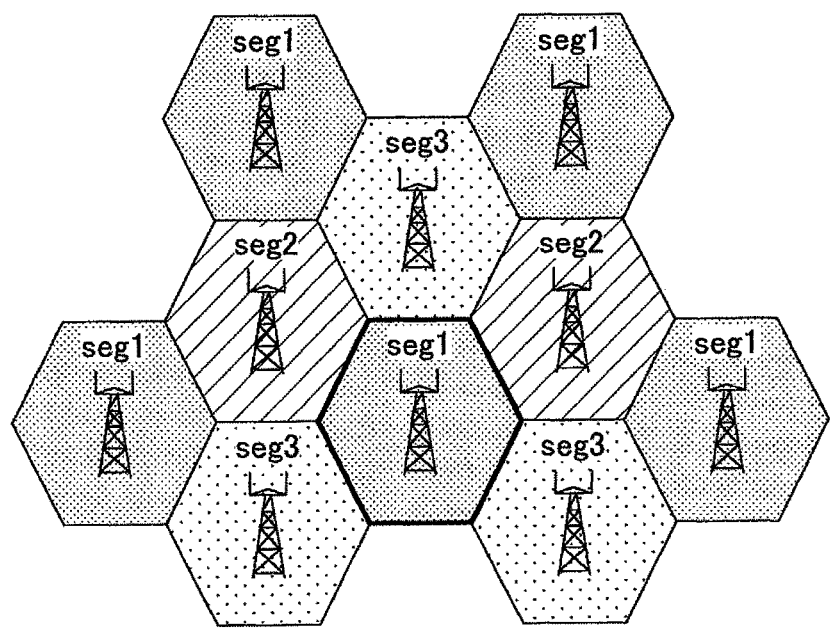
FIG. 2 is a diagram illustrating an example of an arrangement of sub-channels with WIMAX.
Figure 5:
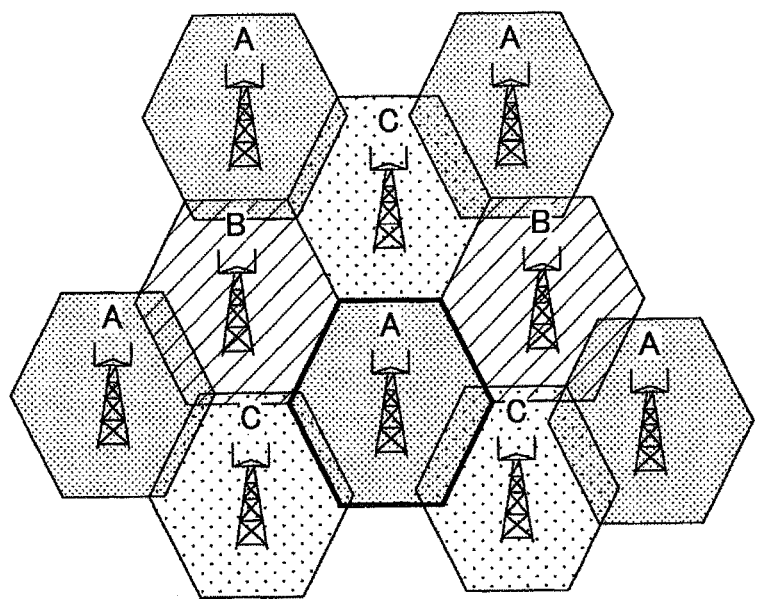
FIG. 5 is a diagram illustrating how an actual cell shape is deviated from an ideal cell shape.
Figure 6:
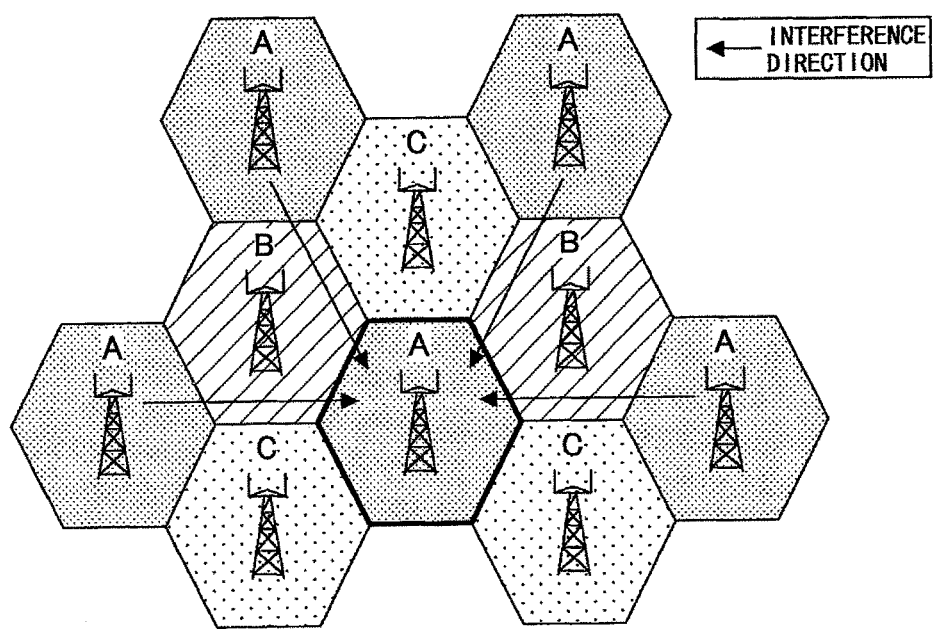
FIG. 6 is a diagram illustrating interference of other cells in an ideal cell shape.
Figure 7:
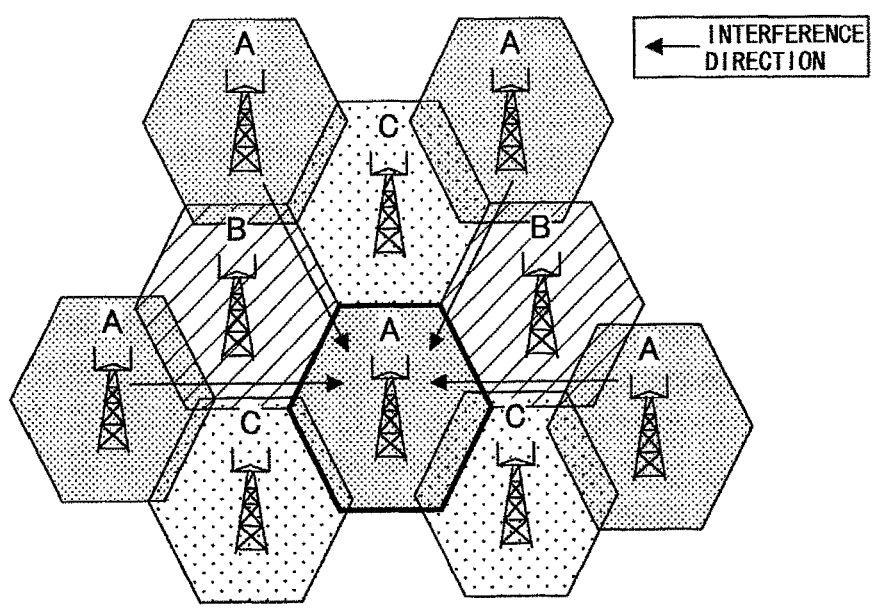
FIG. 7 is a diagram illustrating interference of other cells due to an actual cell shape.

Embodiments of the present invention will be explained with reference to accompanying drawings.
(Overview)
Next, a principle of an operation of the present invention is described.

In this embodiment, shared resource numbers (shared by all cells) are set to corresponding resources (unit resource blocks) designated according to a frequency axis and a time axis of a matrix as illustrated in FIG. 8. In FIG. 8, t1, t2, ... t8 indicate a unit time in assigning resources. The unit time may be set having a given length (for example, an integral multiple of a unit time may constitute a single wireless frame).

According to an embodiment of the present invention, mobile stations (MS) having a wireless propagation status good enough to be assigned a resource are selected. The selected mobile stations are graded (ranked) based on the quantity indicating the status of wireless propagation status (e.g., SIR, SINR, CQI) and arranged according to their graded quality. A MS quality order number (ranking number) is added to each of the mobile stations. A series of shared resource numbers are associated with a series of MS quality order numbers based on a predetermined corresponding relationship. This corresponding relationship (correspondence table) is set to each cell according to a certain condition(s).

Based on SINR information or RSSI information equivalent to quality information reported from the mobile station MS, the base station assigns MS quality order numbers of mobile stations in order, for example, beginning from a target mobile station having a low SINR value or a low RSSI value. For example, in a case where there are 3 target mobile stations, a MS quality order number 1 is assigned to the mobile station having the lowest RSSI value, then a MS quality order number 2 is assigned to the mobile station having the second lowest RSSI value, and then a MS quality order number 3 is assigned to the mobile station having the highest RSSI value.

Cells in a system are divided into 3 groups (Seg1, Seg2, Seg3) by segmentation. The frequency bandwidth used by each cell included in one of the groups (e.g., Seg1) is distinguished by a sub-group number. For example, in a case where a given group includes 4 sub-groups, the sub-groups are identified as sub-group 1, sub-group 2, sub-group 3, and sub-group 4. Although the frequency bandwidth (sub-carrier group) used by each of the sub-groups is the same, the corresponding relationship between the shared resource number and the MS quality order number is different for each sub-group. The MS quality order number corresponding to a given shared resource number is different if the sub-group is different and is the same if the sub-group is the same. Further, a different sub-group number is assigned with respect to near base stations whereas a same sub-group number is assigned with respect to relatively far base stations.

For example, four kinds of sub-groups using a given frequency bandwidth is provided in a matrix table illustrated in FIG. 9.

In sub-group 1, the mobile station MS having the worst SINR value is assigned to a time axis t1 and a frequency f1. In sub-group 2, the mobile station MS having the worst SINR value is assigned to a time axis t3 and a frequency f1. In sub-group 3, the mobile station MS having the worst SINR value is assigned to a time axis t5 and a frequency f1. In sub-group 4, the mobile station MS having the worst SINR value is assigned to a time axis t7 and a frequency f1.

In FIG. 9, the numbers indicated in each unit resource block corresponds to a ranking number. A user having a number equivalent to the ranking number is assigned the unit resource block corresponding to the ranking number. In a cell (BS1) of the sub-group 1, among the users to which resources are assigned, four low ranked (order) users having relatively poor channel status are mapped to a time slot t1. In a cell (BS2) of the sub-group 2, among the users to which resources are assigned, four low ranked (order) users having relatively poor channel status are mapped to a time slot t3. Therefore, users having poor channel status can be prevented from simultaneously using the same frequency.

The user having the ninth poor channel status in sub-group 1 and the user having the poorest channel status in sub-group 2 use the same unit resource block t3/1 and may interfere with each other. However, the channel status of the users belonging to sub-group 1 may not necessarily be a worst state, but rather a relatively satisfactory state. Therefore, it is anticipated that the user of sub-group 1 is closer to a base station. Further, the user belonging to sub-group 2 is anticipated to be near a cell end. Accordingly, the interference between the users is less compared to a case where both users are close to a cell end.

Accordingly, determination of sections is performed by using the wireless environment of a corresponding mobile station as a parameter. A base station (BS1) assigns a first wireless frequency (f1) to a mobile station belonging to a group having the poorest wireless environment (quality order 1) at the first timing (t1) with priority. A base station (BS2) being adjacent to the base station (BS1) and using the same frequency as the base station (BS) also determines a section(s) by using the wireless environment of a corresponding mobile station as a parameter. The base station (B2)

assigns the first wireless frequency (f1) to a mobile station belonging to a group having the poorest wireless environment (quality order 1) at a second timing (t3) which is different from the first timing (t1) with priority. Further, the base station (B2) assigns the first wireless frequency (f1) to a mobile station (e.g., quality order 25) belonging to a group having a better wireless environment than the group having the poorest wireless environment at the first timing (t1) with priority. Accordingly, the risk of the two mobile stations having the worst reception environment (i.e. mobile stations likely to be located on the farthest cell ends) can be prevented from having the same frequency at the same timing.

DETAIL DESCRIPTION

Next, an embodiment of the present invention is described in further detail.

The SINR value or the RSSI value reported from the mobile station to the base station is the ratio between a received power (RSSI value) of a control signal (or pilot signal) constantly transmitted from each cell with fixed transmission power and interference power from other cells or the ratio between received power of a desired signal and interference power from other cells. Therefore, the SINR value or the RSSI value depends on the location of the mobile station (MS) inside the cell. In other words, a mobile station (MS) having a high SINR value (or high RSSI value) is assumed to be a mobile station (MS) located near a center part of a cell. A mobile station (MS) having a low SINR value, for example, is assumed to be a mobile station (MS) located far from a center part of a cell (a place having low reception power from the corresponding cell and being susceptible to interference from other cells, namely the vicinity of a border of a cell). For the sake of convenience, it is assumed that the combination of the data modulation method assigned to the mobile station and the channel encoding rate is invariable.

In a mobile communications system, there is a case where transmission power is controlled and where transmission power is not controlled. Depending on the case, the manner of operation is different. Accordingly, the case where transmission power is not controlled is described first. Then, the case where transmission power is controlled is described. For the sake of convenience, it is a premise that communications from a mobile station (MS) to a base station (UL: Uplink) and communications from a base station to a mobile station (MS) (DL: Downlink) are performed by a TDD (Time Division Duplexing) method. Because resource assignment for the uplink direction and the downlink direction are performed independently, they are described separately below. It is, however, to be noted that the use of TDD is not a requisite.

(1) Case where No Transmission Power Control is Performed in a Downlink Direction In this case, the transmission power from a base station to a mobile station MS located near the center of a cell and the transmission power from a base station to a mobile station MS located at a cell edge are substantially equal. Because propagation loss becomes greater as the mobile station MS becomes farther from the base station, the reception level of the mobile station MS becomes lower as the mobile station MS becomes farther from the base station. On the other hand, the interference level from an interfering base station (base station of another cell using the same sub-channel) becomes larger when the distance from the interfering base station is short whereas the interference level from an interfering base station becomes smaller when the distance from the interference is long. From the aspect of influence of interference applied to other cells, the influence of interference does not depend on the location of the mobile station because the transmission power from the base station is constant. From the aspect of the influence of interference received by the mobile station/base station, the reception level of a desired signal becomes higher as the mobile station is closer to the base station. In this case, interference level is low because the mobile station is located far from the interfering base station.

Therefore, the order of mobile stations MS starting from the mobile station located farthest from the base station corresponds to the order of mobile stations MS susceptible to interference (the likelihood of receiving interference does not depend on the location of the MS as described above). Therefore, mobile stations which are most susceptible to interference can be prevented from being simultaneously assigned the same sub-channel by setting a corresponding relationship between a shared resource number and a MS quality order number so that unit resource blocks of the same frequency are used at different times in a case where the sub-group is different.

(2) Case where Transmission Power Control is Performed in a Downlink Direction

In this case, the transmission power of a base station is controlled so that a mobile station MS receives signals at a desired quality. Because propagation loss is small for a mobile station MS located near the center of a cell, the transmission power from the base station to the mobile station MS does not have to be high. That is, the closer the mobile station is to the base station, the lower the transmission power required by the base station to the mobile station MS may be. Therefore, the influence applied by interference of the base station is small. Further, the closer the mobile station is to the base station, the lower the interference level becomes because the mobile station is located far from other cells which may be the source of interference.

In other words, because the transmission power of the base station to the mobile station MS becomes smaller as the mobile station MS is closer to the base station and the reception interference level becomes smaller for the mobile station MS the closer the mobile station is to the base station, the mobile station located near the base station receives less interference and applies less interference. Therefore, the order of mobile stations MS starting from the mobile station located farthest from the base station corresponds to the order of mobile stations MS susceptible to interference and also corresponds to the order of mobiles stations MS more likely to apply interference.

Therefore, mobile stations which are most susceptible to interference can be prevented from being simultaneously assigned the same sub-channel by setting a corresponding relationship between a shared resource number and a MS quality order number so that unit resource blocks of the same frequency is used at different times in a case where the sub-group are different.

(3) Case where Transmission Power Control is not Performed in an Uplink Direction In this case, the transmission power to a base station from a mobile station MS located near the center of a cell and the transmission power to a base station from a mobile station MS located at a cell edge are substantially equal. Therefore, the reception level of the base station becomes lower as the mobile station MS becomes farther from the base station. On the other hand, the interference level of another base station that receives interference differs depending on the distance between the other base station and the mobile station (interfering station). The base station receives greater interference from the mobile station located in a cell edge and receives less interference from the mobile station located near the center of the cell.

In other words, the interference that the mobile station applies to the other base station differs depending on the location of the mobile station. The interference applied by the mobile station is small the farther the mobile station is from the other base station. In the base station receiving interference, the reception level of desired signals becomes higher the farther the mobile station MS is from the base station, and the interference level becomes lower the farther is the mobile station MS. That is, the base station only receives low interference from the mobile station located distant from the base station. Therefore, the order of mobile stations MS starting from the mobile station located farthest from the base station corresponds to the order of mobile stations MS susceptible to interference and also corresponds to the order of mobile stations MS more likely to apply interference.

Therefore, mobile stations which are most susceptible to interference can be prevented from being simultaneously assigned the same sub-channel by setting a corresponding relationship between a shared resource number and a MS quality order number so that unit resource blocks of the same frequency are used at different times in a case where the sub-group is different.

(4) Case where Transmission Power Control is Performed in an Uplink Direction

In this case, the transmission power of a mobile station is controlled so that a base station can receive an uplink signal of the same quality regardless of the location of the mobile station. Because the reception level of the base station from the mobile station located near the center of a cell exhibits a small propagation loss, the transmission power from the mobile station does not have to be high. That is, the closer the mobile station is to the base station, the lower the transmission power of the mobile station MS is. Therefore, the mobile station MS applies less interference. Further, the closer the mobile station is to the base station, the less interference the mobile station receives from base stations of other cells because the mobile station is located far from other cells. In a case where control of transmission power is performed, the reception level at the base station becomes the same regardless of the location of the mobile station MS. Therefore, the interference received by the base station does not depend on the location of the mobile station MS.

In other words, because the transmission power is low the closer the mobile station MS is to the base station and the interference level is low the closer the mobile station MS is to the base station, the mobile station applies less interference to other stations. Accordingly, the interference received by the base station does not depend on the location of the mobile station MS. Therefore, the order of mobile stations MS starting from the mobile station located farthest from the base station corresponds to the order of mobile stations MS susceptible to interference.

Therefore, mobile stations which are most susceptible to interference can be prevented from being simultaneously assigned the same sub-channel by setting a corresponding relationship between a shared resource number and a MS quality order number so that unit resource blocks of the same frequency are used at different times in a case where the sub-group is different.

In view of the above, a case where mutual interference (applying interference/receiving interference) is large corresponds to a case where mobile stations located near a cell border simultaneously use the same frequency. Accordingly, interference of other cells can be prevented if resources are assigned to avoid such cases from occurring.

Because mobile stations MS having a low SINR value or a low RSSI value are likely to be located at a cell border, an embodiment of the present invention determines a corresponding relationship between a shared resource number and a MS quality order number so that such mobile stations do not simultaneously use the same resource.

For example, as illustrated in FIG. 9, a corresponding relationship between shared resource numbers and MS quality order numbers is prepared, and four sub-groups using the same frequency bandwidths f1-f4 are prepared. Each of $f_1$, $f_2$, may correspond to a resource assignment unit in the direction of a frequency axis. In the example illustrated in FIG. 9, a resource block designated as t1/1 is assigned to a mobile station having the poorest SINR value in a cell (BS1) of sub-group 1. This resource block corresponds to a resource block assigned to a mobile station having the $25^{th}$ poorest SINR value (in other words, a relatively good quality) in a cell (BS2) of sub-group 2. In a case where the number of users located in cell (BS2) of sub-group 2 is less than 25, the resource assignment unit t1/1 is a vacant resource in the cell of sub-group 2. The corresponding relationship between the numbers is determined in a manner that the mobile station MS having the poorest SINR value in one sub-group (cell) does not simultaneously use the same resource (t1/1 or t3/1) as a mobile station MS having the poorest SINR value in another sub-group. The mobile stations having the poorest SINR value are allowed to use the resource block t1/1 only for those belonging to other groups (base stations other than BS1-BS4). Such a base station exists only in a proportion of one out of four cells and is located substantially far away. Because assigning resource block unit t1/1 to the mobile station having the poorest SINR is restricted, even if there are plural mobile stations using the resource block unit t1/1 in the remaining 3 cells in the same group (e.g., Seg1), the interference created can be controlled to be substantially less than that of the mobile stations located at the cell border. This is because mobile stations that influence each other are not mobile stations both located near the cell border but are mobile stations in which at least one of the mobile stations is substantially located far from the cell border. If the number of users in a service area is small, it is possible that the resource block unit t1/1 is used by only one mobile station.

In other words, the mobile stations that simultaneously use the resource block unit t1/1 are the mobile station MS1 which is located at the cell border and most susceptible to interference (mobile station MS located in cell 1) and the mobile station MS2 which applies least interference to the mobile station MS1 (mobile station MS located in cell 2). On the other hand, although the mobile station MS2 is subjected to interference from the MS1 which applies the most interference to other stations, the mobile station MS2 can maintain a desired quality even if the mobile station MS2 receives some interference from the mobile station MS1 because the mobile station MS2 exhibits a relatively good SINR value.

Conventionally, there is a possibility that the same resource block unit be assigned to mobile stations located nearest to each other because the resource block units are independently randomly selected in each sub-group using the same frequency bandwidth. Thus, there is a concern that, in some cases, disconnection or inability to receive data may occur. Such concern can be resolved with this method according to an embodiment of the present invention.

The corresponding relationship between shared resource numbers and MS quality order numbers is not limited to that illustrated in FIG. 9. Other corresponding relationships for sub-groups belonging to the same group may be used. Other corresponding relationships can be used as long as the corresponding relationship of resource assignment is determined beforehand for preventing or minimizing interference and assigning resources so that the mobile stations in a resource table are scattered.

FIG. 10 illustrates another example of a corresponding relationship between shared resource numbers and MS quality order numbers. In the example of FIG. 10, MS quality order number indicates the order of beginning from the worst SINR value. In four sub-groups (cells) belonging to the same group (Seg1), the corresponding relationship is determined in a manner that the total of four MS quality order numbers corresponding to a same shared resource number is the same value with respect to each shared resource number.

For example, with respect to the resource block unit t1/1, the MS quality order number of the sub-group 1 is "1", the MS quality order number of the sub-group 2 is "32", the MS quality order number of the sub-group 3 is "9", and the MS quality order number of the sub-group 4 is "24". Accordingly, the total of the MS quality order numbers is "66". Likewise, with respect to the resource block unit t1/2, the MS quality order number of the sub-group 1 is "2", the MS quality order number of the sub-group 2 is "31", the MS quality order number of the sub-group 3 is "10", and the MS quality order number of the sub-group 4 is "23". Accordingly, the total of the MS quality order numbers is also "66". By making the total value of the MS quality order numbers constant, it is anticipated that the interference in each resource block unit will be substantially the same.

As described above, plural cells using the same frequency bandwidth constitute a single group. By dividing the group into plural sub-groups and assigning different resources to each sub-group, interference can be substantially reduced. Therefore, in designing cells, the necessity for accurately performing, for example, allocation of cells, slight adjustment of the base station (e.g., adjustment of antenna tilt of each cell, adjustment of power) can be reduced. As a result, parameter adjustment can be performed relatively easily in, for example, a running test performed prior to operations.

Embodiment 1

Next, embodiment 1 according to the present invention is described. For the sake of convenience, the following description focuses on a method of assignment in an uplink direction. Further, although the data modulation method and the channel encoding method cannot be adaptively changed, transmission power control is performed. However, the present invention is not limited to these conditions.

Figure 11:
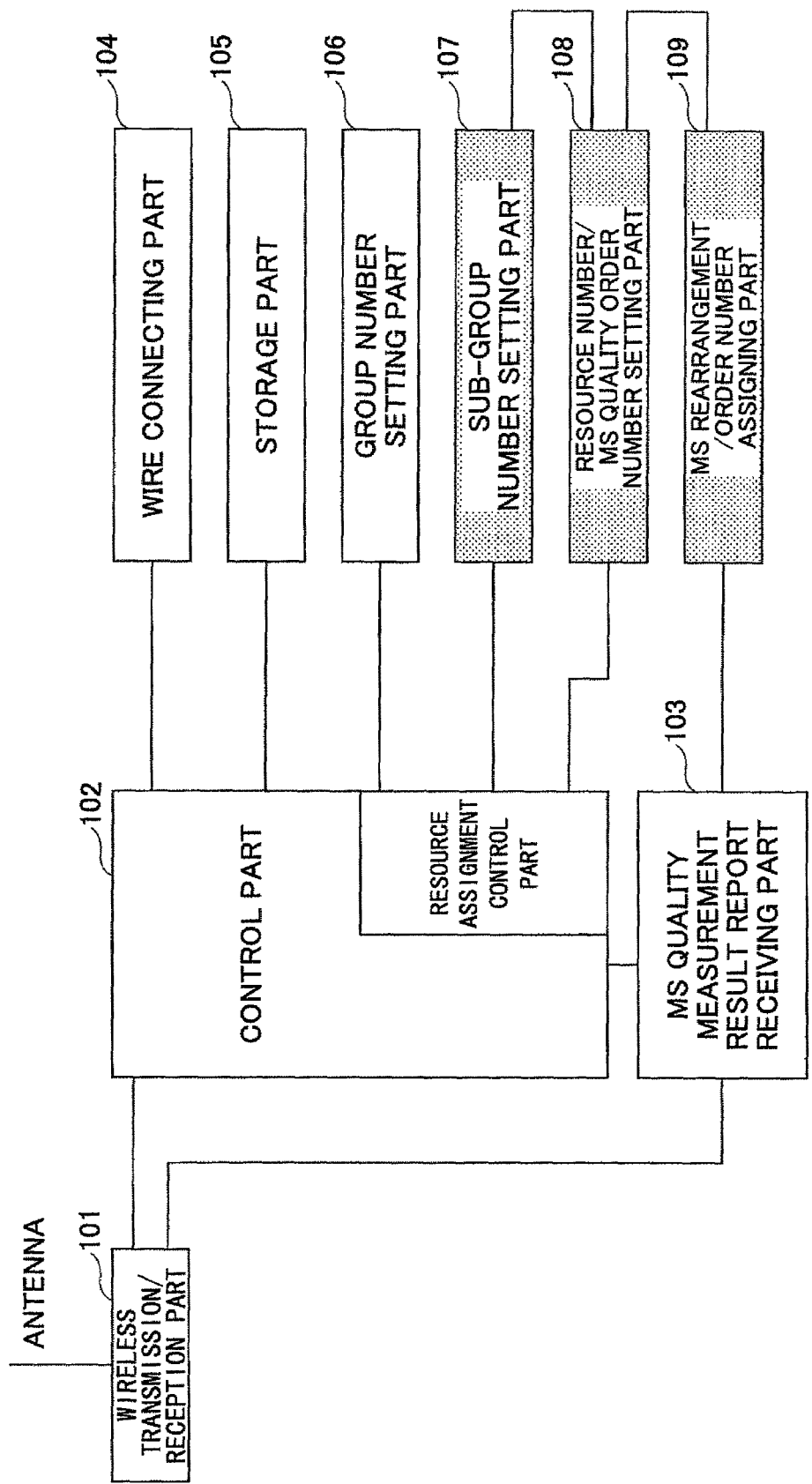
FIG. 11 is a block diagram illustrating functions of a base station according to an embodiment of the present invention.

FIG. 11 is a block diagram illustrating functions of a base station according to an embodiment of the present invention. FIG. 11 illustrates a wireless transmission/reception part 101, a control part 102, a MS quality measurement result report receiving part 103, a wire connecting part 104, a storage part 105, a group number setting part 106, a sub-group number setting part 107, a resource number/MS quality order number setting part 108, and a MS rearrangement/order number assigning part 109.

The wireless transmission/reception part 101 is for transmitting/receiving wireless signals via an antenna and performing processes on the wireless signals. The processes may include, for example, symbol processing based on an OFDM method, digital/analog conversion, frequency conversion, bandwidth control, power amplification, and analog/digital conversion.

The control part 102 controls signal processing such as transmission power control or transmission/reception switching.

The MS quality measurement result report receiving part 103 extracts a measured value from MS quality data included in a signal received from a mobile station.

The wire connecting part 104 provides an interface function for enabling wire communications with an upper level apparatus such as a wireless network controller (RNC) or an access gateway apparatus (aGW).

The storage part 105 stores various kinds of information. In this embodiment, the storage part 105 stores information indicating how the shared resource numbers are set, the corresponding relationship between the shared resource numbers and the MS quality order numbers, and determination criteria for scheduling in resource assignment.

The group number setting part 106 has a function of determining and identifying, for example, the group number of its cell when activated.

The sub-group number setting part 107 determines the sub-group which its cell belongs to from groups using the same frequency bandwidth.

The resource number/MS quality order number setting part 108 determines to which sub-group it belongs to and determines the corresponding relationship (corresponding relationship between shared resource numbers and MS quality order numbers) it should use.

The MS rearrangement/order number assignment part 109 assigns a MS quality order number to each mobile station based on a quality (e.g., SINR value) reported from each of the mobile stations. Typically, the MS quality order number is determined so that the mobile stations are arranged in an order starting from the mobile station having the poorest SINR value.

In general, the MS quality information included in the information received from the wireless transmission/reception part 101 is extracted and determined by the MS quality measurement result report receiving part 103. The determined information is reported to the resource assignment control part (including scheduler function) 102. The scheduler performs resource assignment based on the reported information. The resource used for the resource assignment is selected from the frequency (sub-channel) of the dividing number used in segmentation of its base station (its cell) set by the group number setting part 107.

In this embodiment, values reported from each mobile station are transmitted from the MS quality measurement result report receiving part 103 to the MS rearrangement/order number assigning part 109. The MS rearrangement/order number assigning part 109 arranges the mobile stations MS from the mobile station having the lowest quality data and assigns a corresponding MS quality order number to each mobile station MS. The mobile stations that are assigned with the MS quality order numbers are those having a satisfactory channel status enough to be assigned a wireless resource in a subsequent sub-frame. For example, a number of mobile stations MS having the top MS quality measurement results are assigned with the MS quality order numbers. Accordingly, the number of mobile stations having the top MS quality measurement results are arranged beginning from those having relatively poor quality information and are assigned with corresponding MS quality order numbers.

The sub-group setting part 107 is for newly setting sub-group numbers within group numbers. Then, the resource number/MS quality order number setting part 108 associates the sub-group numbers with the order numbers assigned to the mobile stations according to a predetermined corresponding relationship. The result of the association is transmitted to the control part 102. Accordingly, the control part performs resource assignment.

Figure 12:
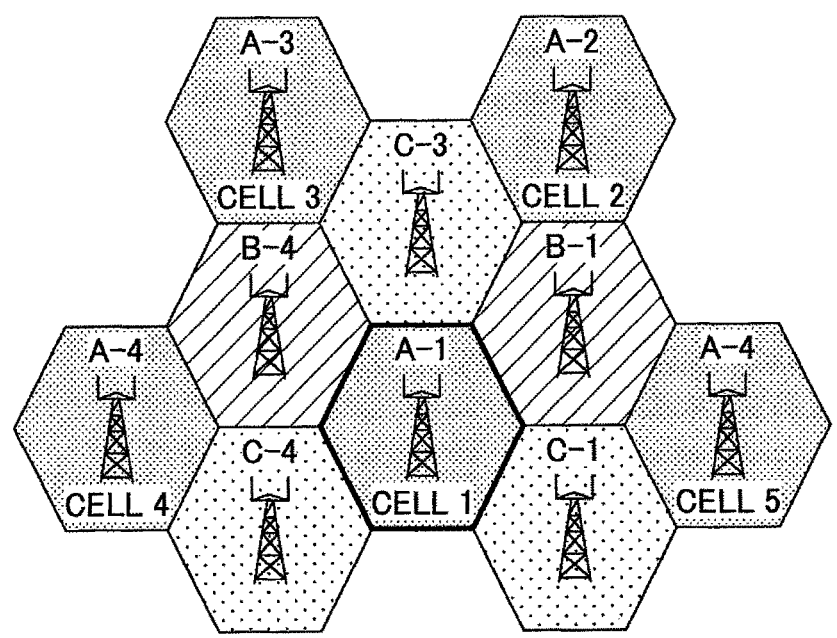
FIG. 12 is a diagram illustrating an example of an assumed arrangement of sub-groups according to an embodiment of the present invention.

FIG. 12 illustrates an example of allocation of sub-groups according to an embodiment of the present invention. The cells have an omni-configuration. In the cells, sub-channels are repeatedly allocated in 3 zones. The system bandwidth is divided into A, B, and C by segmentation. Each segment (each group) includes 4 sub-groups. For example, segment A includes sub-groups A-1, A-2, A-3, and A-4. The four sub-groups use the same frequency bandwidth.

Figure 13:
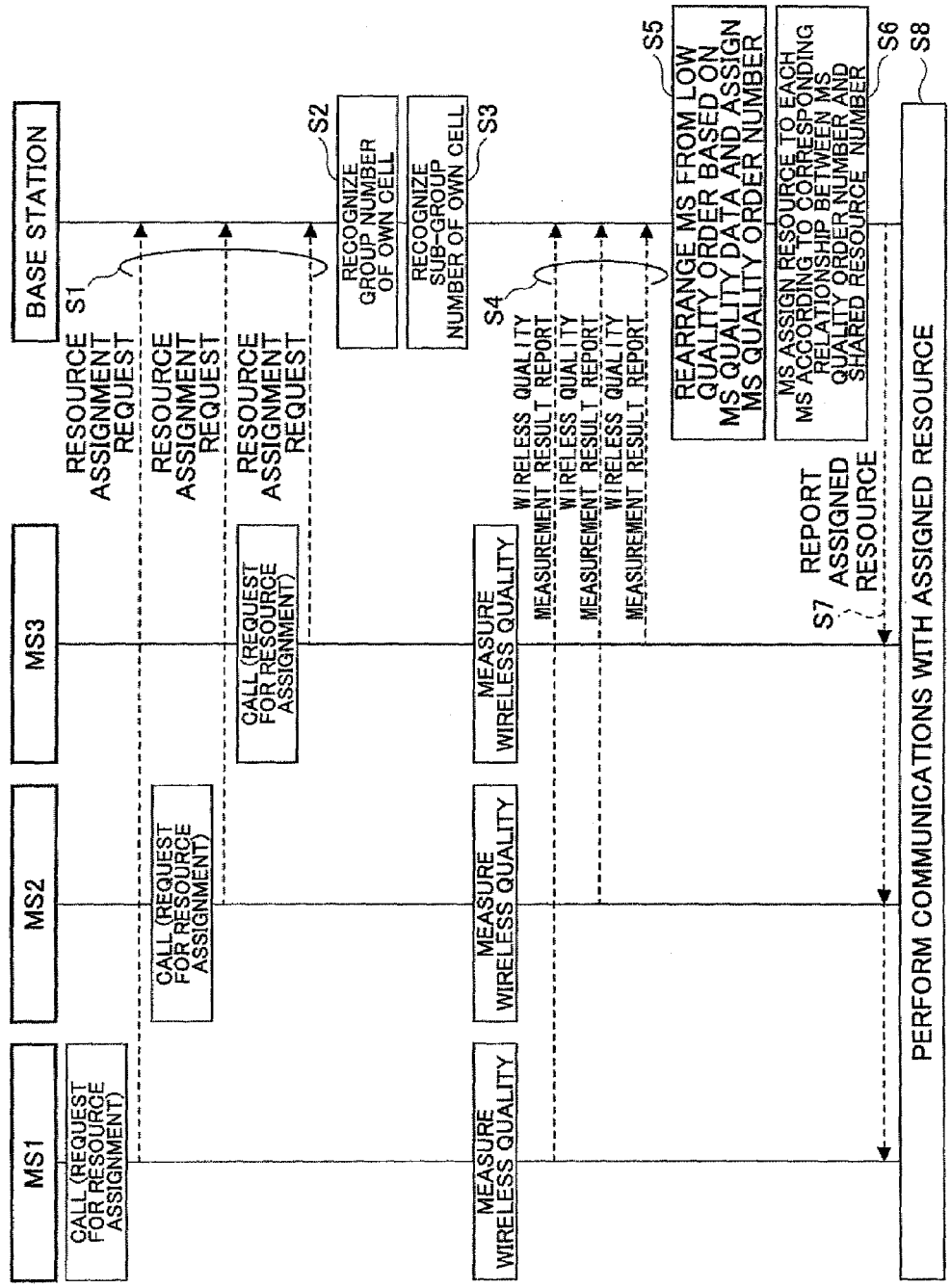
FIG. 13 is a flowchart illustrating an example of an operation according to an embodiment of the present invention.

FIG. 13 is a flowchart illustrating an operation according to an embodiment of the present invention. In Step S1, each of the mobile stations MS1, MS2, and MS3, sends a request (transmits an assignment request signal) for requesting assignment of a resource.

In Step S2, a group number of the cells is recognized. In the example of FIG. 12, it is determined which cell the mobile station belongs to.

In Step S3, the sub-group number is confirmed. For example, the base station of FIG. 13 corresponds to A-1 of FIG. 12.

In Step S4, each of the mobile stations M1, M2, and M3 measures its wireless quality. The wireless quality may be, for example, a RSSI value measured by the mobile station. The measured value is reported to the base station.

In Step S5, based on the reported RSSI value, the base station selects a mobile station having a quality satisfactory enough to perform communications in a subsequent wireless frame. For the sake of convenience, the mobile stations illustrated of FIG. 3 are all selected. The base station arranges the RSSI values beginning from the poorest in order. Based on this order, the base station assigns a MS quality order number to the mobile stations. Typically, the RSSI value and the location of the mobile station MS (distance from base station (near/far)) have a unique relationship (for example, a relationship which can be linearly approximated). Based on such relationship, the mobile stations MS can be arranged starting from the mobile station farthest from the base station. For example, a MS quality order number of a first number may be assigned starting with the farthest mobile station. By obtaining the location information of the mobile station, the mobile stations can be arranged from the one farthest from the base station.

In the example of FIG. 12, 3 mobile stations (MS1, MS2, MS3) exist in the service area of a center cell (A-1). In this example, the reception levels of the mobile stations MS1, MS2, and MS3 are −90 dBm, −100 dBm, and −80 dBm, respectively (first and second lines in table of FIG. 14). In this case, the mobile station MS3 having the highest reception level is nearest to the base station. The mobile station MS1 having the second highest reception level is located farther from the base station than the mobile station MS3. The mobile station having the lowest reception level is located nearest to the cell border among the 3 mobile stations. The MS quality order number is arranged starting from the lowest RSSI value. Thus, MS quality order numbers 1, 2, and 3 are assigned to mobile stations MS2, MS1, and MS3 in this order.

Three mobile stations (MS4, MS5, MS6) also exist in a cell having the same segmentation number but with a different sub-group number (e.g., A-2). Also in this example, the reception levels of the mobile stations MS4, MS5, and MS6 are −95 dBm, −85 dBm, and −80 dBm, respectively (third and fourth lines in table of FIG. 14). In this case also, the mobile stations are arranged starting from the mobile station farthest from the base station in the order of MS4, MS5, and MS6. Thus, MS quality order numbers 1, 2, and 3 are assigned to mobile stations MS4, MS5, and MS6 in this order.

In this manner, each base station prepares MS quality order numbers for the corresponding mobile station.

In Step S6 of FIG. 13, based on the corresponding relationship determined for the sub-groups, resource assignment is performed by associating MS quality order numbers to corresponding shared resource numbers. Scheduling information indicating the content of the assigned resources is reported to the corresponding mobile station in Step S7. Then, communications are performed in Step S8.

In one example, the corresponding relationship between shared resource numbers and MS quality order numbers in cell 1 is determined as the relationship of sub-group 1 illustrated in FIG. 9, and the corresponding relationship between shared resource numbers and MS quality order numbers in cell 2 is determined as the relationship of sub-group 2 illustrated in FIG. 9. Further, in this example, each mobile station desires to perform communications using four resource block units. Accordingly, in this example, resource assignment is established in the manner illustrated in FIG. 15.

As illustrated in FIG. 15, in cell 1, a time slot t1 is assigned to a mobile station MS2, a time slot t2 is assigned to a mobile station MS1, and a time slot t3 is assigned to a mobile station MS3. Meanwhile, in cell 2, a time slot t3 is assigned to a mobile station MS4, a time slot t4 is assigned to a mobile station 5, and a time slot t5 is assigned to a mobile station 6. In the corresponding cells, mobile station MS2 and MS4 are located nearest to their respective zone borders and are most susceptible to interference. However, because resources are assigned to the mobile stations MS2 and MS4 in a different time axis, the largest interference, which would be generated if the mobile stations MS2 and MS4 simultaneously use the same resource block, can be prevented.

In this example, the same resource block unit is simultaneously assigned to the mobile station MS3 of cell 1 and the mobile station MS4 of cell 2. Thus, the mobile stations MS3 and MS4 interfere with each other. Because the mobile station MS4 of cell 2 is located closest to the zone edge, the mobile station MS4 performs transmission power control for using high transmission power and maintains a desired quality. On the other hand, the mobile station MS3 does not perform transmission with full power at least because the mobile station MS3 is located relatively near the center of cell 1. In addition, the mobile station MS3 receives less interference compared to a mobile station located in the zone edge of the cell 1 because the mobile station MS3 is located substantially far from the cell 2. Therefore, it is anticipated that the signal quality of the mobile station MS4 is guaranteed. The mobile station MS4 is assumed to withstand interference from the mobile station MS3 as long as the mobile station MS4 can withstand interference from the zone edge of cell 1.

Meanwhile, because the mobile station MS3 is located near the center of cell 1, its distance from the mobile station MS4 located at the zone edge of cell 2 is greater than that of the mobile stations located near the zone edge of cell 1. The reception level of the base station in cell 1 can be maintained at a constant level in a case where transmission power control is performed. Even if there is an increase of interference, quality can be maintained by increasing transmission power to some degree. Therefore, the mobile station MS3 has better quality compared to a case of being assigned with the same resource block unit as the mobile station MS located at the zone edge of the cell 1.

As illustrated in FIG. 12, with respect to a cell 1 serving as the center cell, the upper left cell is assumed as cell 3, the left cell is assumed as cell 4, and the right cell is assumed as cell 5. The cell number and reception level of each mobile station in each cell is illustrated in FIG. 14.

The resource assignment table illustrated in FIG. 16 can be obtained by assigning the mobile stations MS1 through MS16 with corresponding MS quality order numbers and corresponding resource locations are associated with the MS quality order numbers for each sub-group number. In this case also, it can be understood that the worst case (case where mobile stations having largest interference simultaneously use the same resource) is positively prevented.

Mobile stations MS13 and MS16, which have the largest interference in cell 4 and cell 5, simultaneously use the same resource. However, the cells 4 and 5 are not cells using the same frequency A and being located nearest to each other, but have the cell 1 using the same frequency A and being located therebetween. Although four sub-groups are repeated, the distance between the cells can be increased by appropriately arranging the sub-groups. In other words, neighboring cells are controlled so that mobile stations having highest interference do not simultaneously use the same resource.

It is to be noted that the corresponding relationship between MS quality order numbers and shared resource numbers with respect to each cell may be changed even in a case where the MS quality order numbers are arranged starting from the best RSSI value. In the following example, it is supposed that the numbers are arranged starting from the best RSSI value. In this case, the users having the best RSSI values and being assigned MS quality order numbers 1, 2, 3, . . . (e.g., users located near the base station) are prevented from simultaneously using the same resource block unit. However, users having large MS quality order numbers (e.g., users located at the cell edge) cannot be positively prevented from simultaneously using the same resource block unit. Thus, for example, an undesired case where the users located at the cell edges of the sub-groups 1 and 2 simultaneously use the resource block unit t8/1 may occur. Therefore, it is preferred that the MS quality order number be arranged in an order starting from a poor quality.

Embodiment 2

According to an embodiment of the present invention, adaptive modulation and channel encoding (AMC) may also be applied. For the sake of convenience, no transmission power control is performed. With the adaptive modulation method, the data modulation method used in the wireless lines of the mobile station MS may be adaptively changed according to a reception quality status of the mobile station MS. For example, in a case where reception quality is satisfactory, the mobile station MS may be located near the base station. Further, in a case where the SINR value is high, a method exhibiting a large transmission rate (e.g., 64 QAM) may be used. On the other hand, in a case where reception quality is poor, the mobile station MS may be located near the cell border. Further, in a case where the SINR value is low, a method exhibiting a low transmission rate (e.g., QPSK method) may be used. Accordingly, in a case where different modulation methods are used, the quality of the mobile station may differ depending on whether the mobile station is located near the center of a cell or near the border of a cell.

Figure 17:
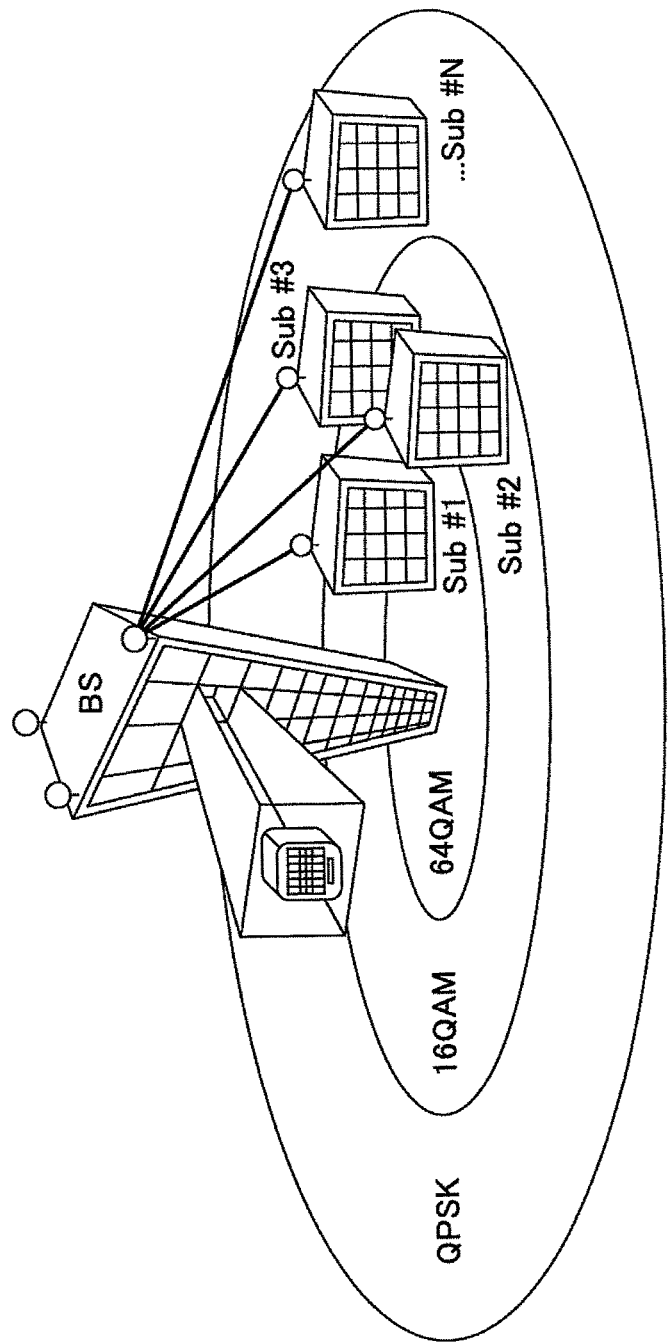
FIG. 17 is a schematic diagram illustrating AMC.

As illustrated in FIG. 17, as the location of the mobile station capable of using a high rate modulation method (e.g., 64 QAM) gradually moves away from the center of the cell, the reception quality of the mobile station decreases to a limit where the high rate modulation method (e.g., 64 QAM) cannot be satisfactory used. Further, when the mobile station modes to a location far from the base station, the modulation method is changed to a low rate modulation method (e.g., 16 QAM) for attaining a desired quality. As the mobile station using the low rate modulation method moves farther from the base station to a limit where the low rate modulation method (e.g., 16 QAM) can no longer maintain a satisfactory quality, the modulation method is changed to a lower modulation method (e.g., QPSK) for attaining a desired quality.

In a case where the AMC method is used, endurance against interference does not uniformly decrease in correspondence with the distance from the base station. For example, in a case where the distance from the base station is at the limit distance of the 64 QAM modulation method, spare power (endurance) is insufficient for maintaining a satisfactory reception level for the 64 QAM modulation method. However, in a case of a location farther than the limit distance, a low rate method of 16 QAM modulation is used because a satisfactory quality can easily be attained while maintaining spare power.

Therefore, unlike the fixed modulation method (or unlike the above-described relationship between distance and interference using the same modulation method), the influence of interference (applying interference/receiving interference) does not uniformly decrease in correspondence with the distance from the base station. In this case, although it is possible to rearrange the order of the MS quality order number, control may become complicated.

However, such complication can be resolved by, for example, determining the endurance (spare power) in a case of the modulation method having the lowest transmission rate (i.e. the modulation method having the lowest reception level). By doing so, even if a desired quality cannot be attained by a modulation method adaptively used, desired communication can be continued by using a modulation method having its rate lowered one level. Therefore, the method described in the first embodiment may also be applied.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station belonging to one of plural cells using a same portion of a system bandwidth, comprising:
   a part configured to determine which user apparatus among the user apparatuses existing in a service area should be assigned one or more resource block units located in a matrix having a frequency axis and a time axis, the resource block unit having a predetermined bandwidth in the matrix and a predetermined time period in the matrix and being identified by a shared resource number shared by the plural cells;
   a part configured to grade the plural user apparatuses based on wireless transmission statuses of the plural user apparatuses and determine ranking numbers corresponding to the plural user apparatuses;
   a part configured to generate assignment information indicating which of the plural user apparatus should be assigned to which of the resource block units according to a predetermined corresponding relationship between the shared resource number and the ranking number; and a part configured to report the assignment information to the corresponding plural user apparatuses;

wherein the predetermined corresponding relationship is determined to be different among the plural cells using the same frequency bandwidth, wherein the ranking numbers represent the order of poor wireless transmission status, wherein the ranking numbers are associated to corresponding shared resource numbers.

2. The base station as claimed in claim 1, wherein the predetermined corresponding relationship is determined so that resource block units having the same frequency but with different time spans are assigned to the user apparatuses having the same ranking number.

3. The base station as claimed in claim 1, wherein an arrangement of ranking numbers represents the distance from a user apparatus.

4. The base station as claimed in claim 1, wherein the predetermined corresponding relationship is determined so that, among the plural cells using the same frequency bandwidth, a difference between one ranking number of one cell corresponding to one shared resource number and another ranking number of another cell is equal to a difference between the ranking number of the other cell corresponding to the other shared resource number and the ranking number of the other cell.

5. The base station as claimed in claim 1, wherein one of the two cells using the same frequency bandwidth has the ranking order of an ascending order associated with a series of shared resource numbers, wherein the other has the ranking order of a descending order associated with a series of shared resource numbers.

6. The base station as claimed in claim 1, wherein the predetermined corresponding relationship is determined so that, among the plural cells using the same frequency bandwidth, the total value of plural ranking numbers corresponding to one shared resource number is equal to the total value of plural ranking numbers corresponding to another shared resource number.

7. The base station as claimed in claim 1, wherein the base station is configured to use a mobile communications system of an OFDMA (Orthogonal Frequency Division Multiple Access).

8. The base station as claimed in claim 1, wherein, in a case where an adaptive modulation and channel encoding (AMC) method is used, the wireless transmission status is represented as a reserved power that is anticipated when a predetermined combination of a data modulation method and a channel encoding rate is used for attaining a desired quality.

9. A method used for a base station belonging to one of plural cells using a same portion of a system bandwidth, comprising:

determining which user apparatus among the user apparatuses existing in a service area should be assigned one or more resource block units located in a matrix having a frequency axis and a time axis, the resource block unit having a predetermined bandwidth in the matrix and a predetermined time period in the matrix and being identified by a shared resource number shared by the plural cells;

grading the plural user apparatuses based on wireless transmission statuses of each of the plural user apparatuses and determining ranking numbers corresponding to the plural user apparatuses;

generating assignment information indicating which of the plural user apparatuses should be assigned to which of the resource block units according to a predetermined corresponding relationship between the shared resource number and the ranking number; and reporting the assignment information to the corresponding plural user apparatuses;

wherein the predetermined corresponding relationship is determined to be different among the plural cells using the same frequency bandwidth, wherein the ranking numbers represent the order of poor wireless transmission status, wherein the ranking numbers are associated to corresponding shared resource numbers.

10. A base station using a same frequency bandwidth as an adjacent base station for performing section determination by using wireless environments of target mobile stations as a parameter and assigning a first wireless frequency defined by a matrix table having a frequency axis and a time axis to a mobile station belonging to a group having the worst wireless environment with priority at a first timing defined by the matrix table, comprising:

a part configured to perform the section determination using the wireless environments of the target mobile stations as the parameter; and a part configured to assign the first frequency to the mobile station belonging to a group having the worst wireless environment with priority at a second timing defined by the matrix table and is different from the first timing, and assign the first wireless frequency to a mobile station belonging to a group having a wireless environment better than the group having the worst wireless environment;

wherein the wireless environments include ranking numbers representing the order of poor wireless transmission status, wherein the ranking numbers are associated to corresponding shared resource numbers.

* * * * *